E. C. HENN.
MULTISPINDLE SCREW MACHINE.
APPLICATION FILED FEB. 10, 1908.

984,274.

Patented Feb. 14, 1911.
3 SHEETS—SHEET 2.

Witnesses.
John H. Lynch.
H. O. Penney.

Inventor.
EDWIN C. HENN,
By his Attorney,
F. H. Richards.

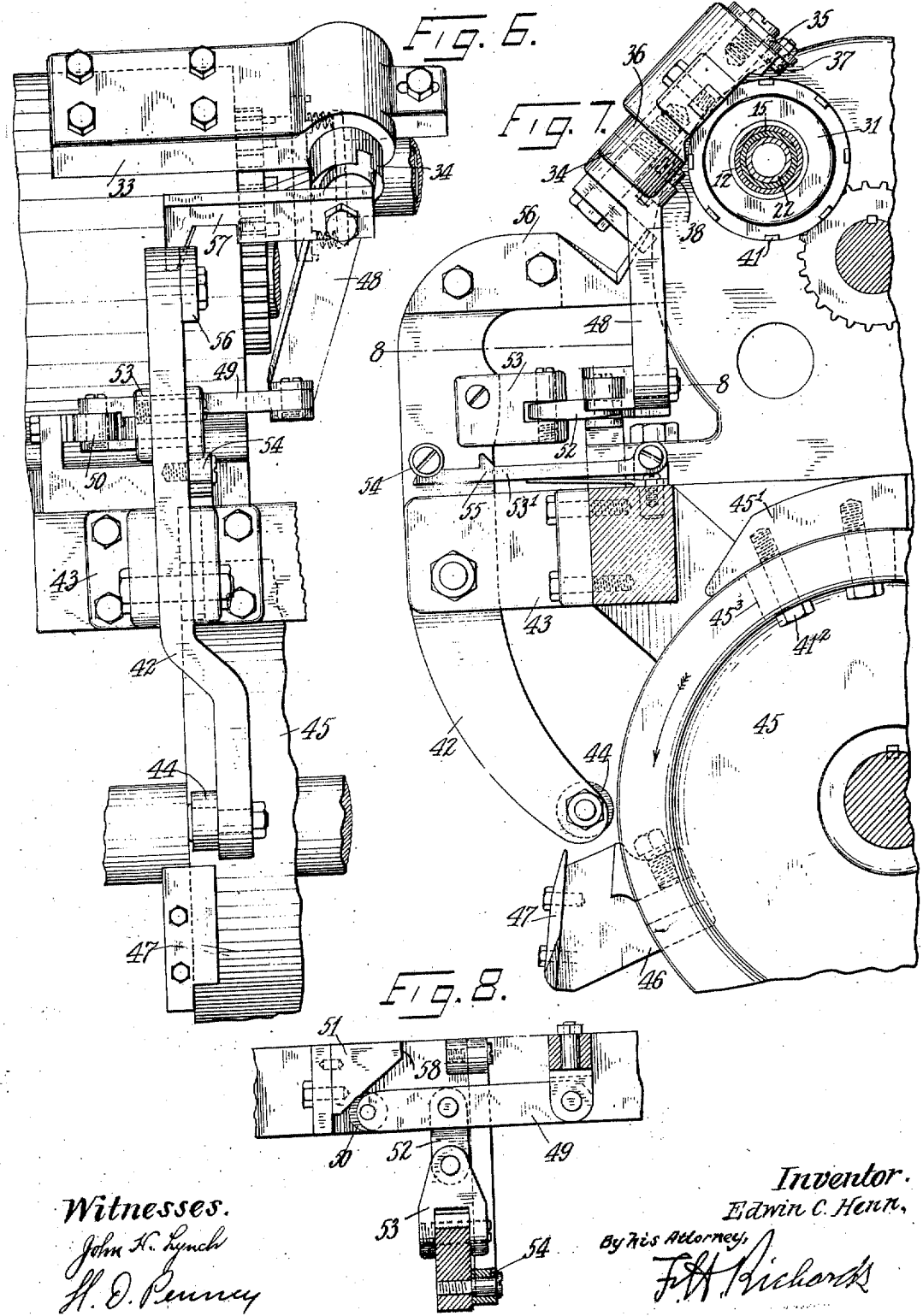

UNITED STATES PATENT OFFICE.

EDWIN C. HENN, OF CLEVELAND, OHIO, ASSIGNOR TO THE NATIONAL-ACME MANUFACTURING COMPANY, OF CLEVELAND, OHIO, A CORPORATION OF OHIO.

MULTISPINDLE SCREW-MACHINE.

984,274.                 Specification of Letters Patent.     Patented Feb. 14, 1911.

Application filed February 10, 1908.   Serial No. 415,039.

*To all whom it may concern:*

Be it known that I, EDWIN C. HENN, a citizen of the United States, residing in Cleveland, in the county of Cuyahoga and State of Ohio, have invented certain new and useful Improvements in Multiple-Spindle Screw-Machines, of which the following is a specification.

This invention relates to screw machines of the automatic type, in which there is a series of spindles carrying the rods to be operated upon and which are simultaneously engaged by various tools that perform the successive operations to produce the screw or other product.

The object of the invention is to provide in this class of machine improved means for engaging and releasing the actuating mechanism for rotating the stock spindles.

Figure 1:
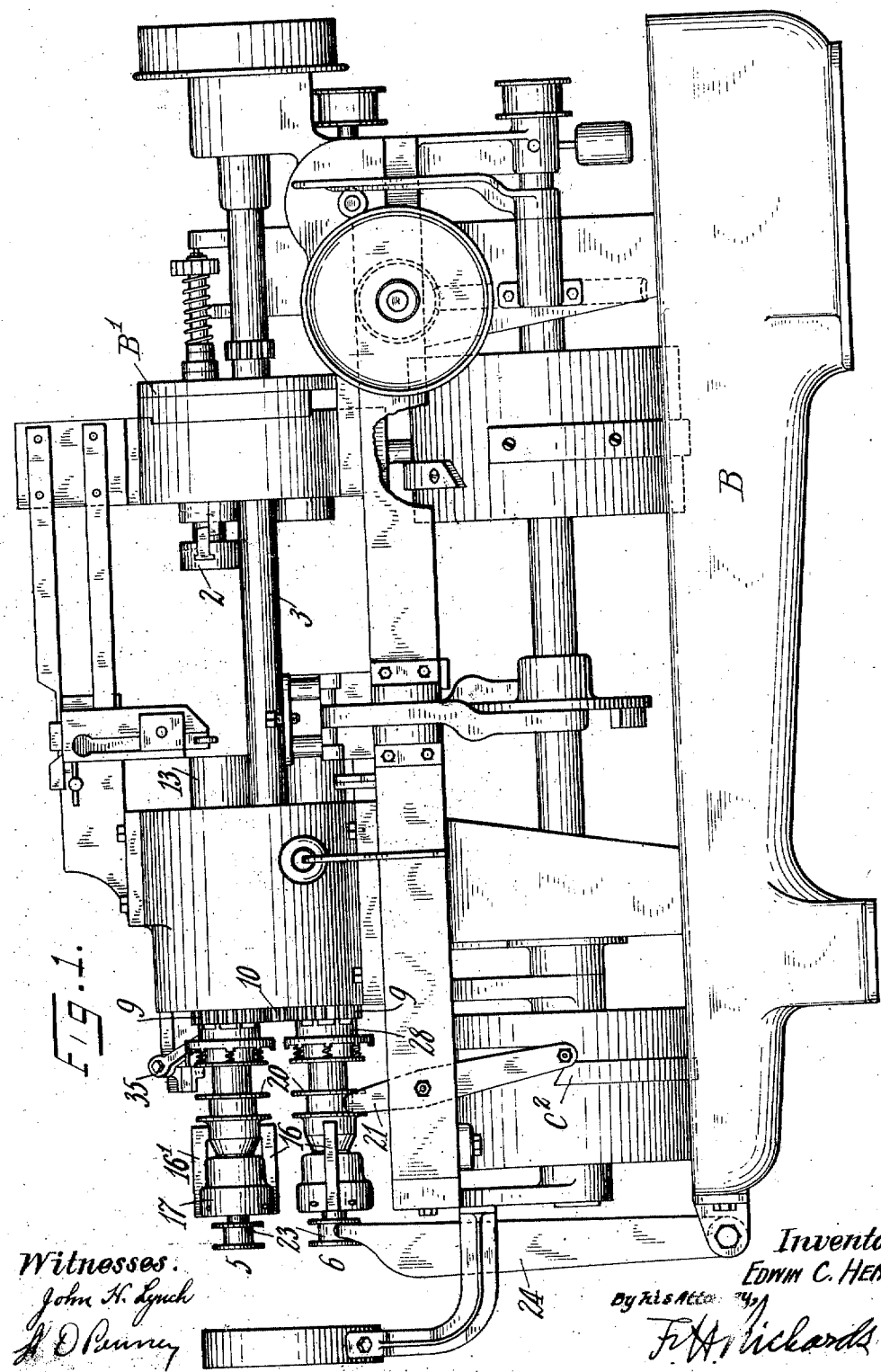
Figure 2:
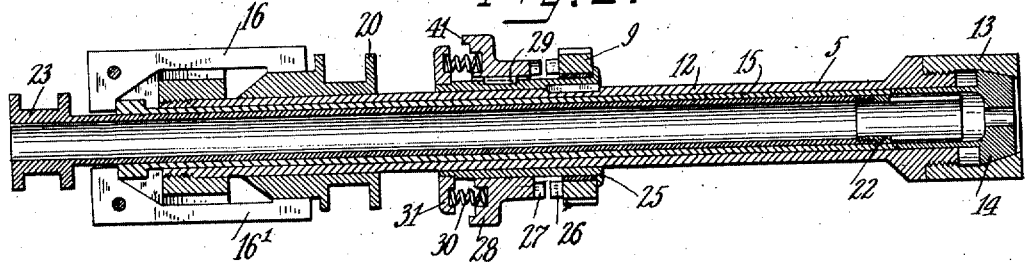
Figure 3:
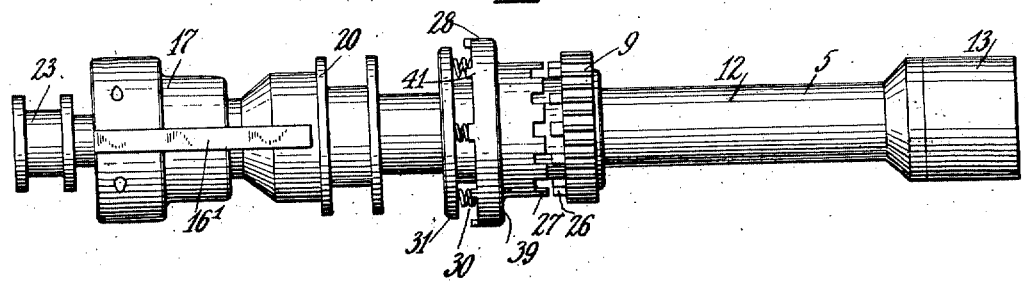
Figure 4:
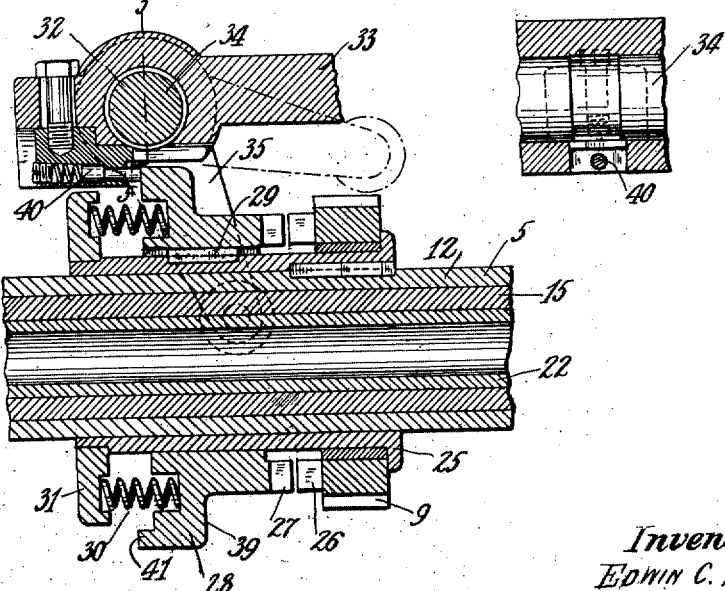
Figure 5:
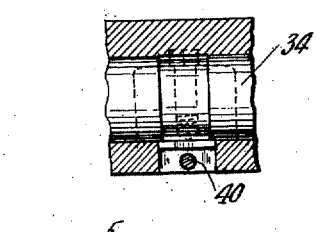

In the accompanying drawings, representing a multiple spindle screw machine embodying my invention, Figure 1 is a front elevation of the machine; Fig. 2 is a longitudinal section through one of the screw-rod spindles, showing the clutch and other details; Fig. 3 is a side elevation of the parts shown in Fig. 2; Fig. 4 is a view showing enlarged part of the clutch shown in Fig. 2, with the operating and locking details; Fig. 5 is a section on the line 5—5 shown in Fig. 4; Fig. 6 is a detail elevation showing part of the mechanism for operating the clutch shown in Fig. 2; Fig. 7 is a side elevation of parts shown in Fig. 6; Fig. 8 is a section on the line 8—8 shown in Fig. 7.

The machine is shown as having a bed B supported in any suitable manner, and a tool carrier B' is suitably supported for horizontal movement. But the carrier may have three other tools mounted thereon equidistant from the main driving shaft 3 and separated a quadrant's distance.

The machine is shown as provided with a series of work-carrying spindles denoted generally by 5, 6. These spindles are identical in construction and operation, and one of them is shown enlarged in detail in Figs. 2, 3 and 4. These spindles are placed a quadrant's distance apart and in a circular series around the main driving shaft 3. Suitable means are provided for rotatably supporting these four spindles, whereby they can be intermittently advanced in one direction of rotation so that the rods in the several spindles will be successively presented in alinement with the die in the tool carrier. Each of the stock spindles carries a driving gear 9, all of which mesh with a gear 10 fast on the main driving shaft 3. Suitable indexing means effects this intermittent advance of the stock spindles and locks them in the proper position. These mechanisms form no part of the present invention and need not be described, but may be of the character set forth in patent to myself and another, No. 655,974, August 14, 1900. These stock spindles, as particularly shown in Figs. 2 to 4, comprise a chuck sleeve 12 supported in the carrier and having at the inner working end thereof an internally flared chuck-compressing head 13, and a compressible collet or chuck 14 supported for reciprocatory movement within the sleeve and having a tapered face corresponding with the internal face of the head 13 whereby the latter is clamped on the rod inclosed therein. A tubular thrust member 15 is supported to reciprocate in the sleeve 12 with its outer end in position for engaging the inner end of the chuck to advance the latter to its clamping position. The thrust member has at its opposite end a collar and a pair of thrust-rod actuating fingers 16 and 16' pivotally supported on arms fixed to the collar 17 secured to this end of the sleeve 12. Each of the fingers is somewhat L-shaped and their outer ends engage the outer end of the grooved collar 20 of the thrust member that is loosely mounted on sleeve 12 to reciprocate, and having a conical end coöperating with the fingers 16 and 16', the conical end serving to spread the ends and impart a forward movement to the thrust member. An actuating lever 21 pivoted on the frame of the machine has a pin entering the groove in the collar 20 when the collar arrives in coöperative relation with the lever, and a cam $C^2$ fixed to the cam shaft has straps arranged to engage this lever and rock it at the proper time.

The means for feeding the screw rod in the spindle consists of a clamp sleeve 22 supported within the thrust member 15 having at the outer end a grooved head 23. A lever 24 pivoted on the machine is suitably operated from the cam drum at the proper time to engage the grooved head 23 and reciprocate the same. When the collar 20 is shifted to cause the arms 16 and 16' to open and release the rod in the clutch 14, the gripping member 22 is moved endwise to advance the rod. Thereupon the head 20 is shifted in the other direction to again grip the rod by the clutch jaws 14, when the sleeve 22 is returned to its former position without shifting the rod.

As before stated, the gear 9 is in all positions of the spindles in mesh with the gear 10 on the driving shaft, and, hence will be continuously rotated. Suitable clutch mechanism is provided for locking the gear 9 to the spindle 12 and releasing the same at the proper times. This clutch mechanism is shown as comprising a sleeve 25 splined to the spindle 12, and the gear 9 is freely rotatable on this sleeve. The gear carries on one face a series of clutch teeth 26 arranged to engage a series of clutch teeth 27 on a clutch member 28 that is slidable on the sleeve 25 but prevented from rotating thereon, by a spline 29. The clutch member 28 is normally pressed into engagement with the clutch teeth on the gear 9 by springs 30 pressing thereon and also engaging a disk 31 fast on the sleeve 25. By this means the gear 9 is normally locked to rotate the spindle.

When it is desired to disengage the gear from the spindle and arrest one of the spindles in the position for cutting the thread, a lever or yoke 32 is provided rotatable in a journal plate 33 mounted on the spindle head. This yoke comprises a shaft 34 having two arms 35 and 36 carrying rollers 37 and 38 that engage the flange 39 of the clutch member 28 and press the latter away from the gear 9 to disengage the clutch teeth, thereby freeing the stock spindle. In order to positively arrest the stock spindle and hold it stationary when the clutch members are disengaged, a spring pin 40 is carried by the member 33 in position to engage suitable teeth 41 on the flange 39 when shifted to disengage the clutch members by the yoke arms. Means are provided for swinging this yoke when the tool spindle arrives at the thread-cutting position, to open this clutch, and also to close it at the proper time in the threading operation. Means for this purpose are shown in Figs. 6, 7 and 8 as comprising a lever 42 hinged to a block 43 carried by the machine, and having at its lower end a roller 44 to engage suitable straps on a cam drum 45, that is suitably actuated. The lever is shown with the roller adjacent the surface of the drum, from which position it is swung outward by a strap or cam 45′, the drum rotating in the direction of the arrow. The lever is locked in this position until, by the rotation of the drum, the roller engages a strap 46 having a ledge 47 on its outer portion, that is inclined and swings the lever inward to its former position. The shaft 84 has an actuating arm 48 to which is pivoted a lever 49 carrying a roller 50 that impinges on an inclined stop member 51. A link 52 connects the lever 49 with a hinge block 53 pivoted on the lever 42. By this means, when the lever 42 is swung the link 52 will serve to swing the lever 49. But its roller 50 engaging the stop 51 will give the lever 49 an endwise movement that will swing the arm 48 and rock the yoke member in one direction. To limit this movement of the lever 42, which is effected by the cam strap 45′, a spring latch 53′ is pivoted on the frame and engages a stop pin 54 carried by lever 42. A lug 55 on the latch engages the pin 54 and limits the inward movement of this part of the lever. When the lever 42 is swung in the opposite direction by the cam strap 45′, a hook arm 56 on the lever 42 engages a hook arm 57 fast to the shaft 34, and thereby returns the yoke to its normal position. When the lever 49 is swung from the lever 42 it will pass beyond the inclined surface of the stop 51 to an end surface 58 that will lock the lever 49 in this position and prevent shifting of the yoke until the lever 42 is again swung. But, before the hook arms engage, the lever 42 has started to swing and pull the lever 49 away from this abutment surface. Thereupon the hook arms return the yoke to its former position.

Having thus described my invention, I claim:

1. In a multiple spindle screw machine, the combination with a driving shaft, a carrier having a series of stock holding spindles, the carrier being rotatably supported for intermittently swinging the spindles to consecutive circular positions, a driving member carried by each of the stock spindles that is constantly rotated from said shaft in all positions of the stock spindles, and a member on each spindle shiftable to connect and disconnect the spindle with the driving member to rotate the same, of mechanism arranged to engage each of the driving members when its spindle is brought to a certain position of the orbit of the spindles to positively shift the driving member to engage and to release the stock spindle, said mechanism comprising a lever pivoted on the machine, a cam drum, a cam on the drum to engage and swing the lever in one direction, a second cam on the drum to engage the lever and swing it back in the opposite direction, a stub shaft rotatable in the frame, an arm on said shaft arranged to engage said driving member to shift it to engage the spindle, means to disengage the driving member when the said arm is retracted, a second arm carried by said shaft arranged to engage a portion of said lever whereby the arm and shaft are swung in one direction, a third arm secured on said shaft, a lever pivoted to said third arm, connections between said operating lever and the lever on the third arm whereby the said latter lever is swung from the former, and an inclined abutment arranged to engage the free end of the lever on the third arm to cause endwise movement of such lever when it is swung by said operating lever to effect the swing of said third arm and the stub shaft in one direction, the stub shaft being swung in the other direction by the engagement of said second arm by the operating lever.

2. In a multiple spindle screw machine, the combination with a driving shaft, a carrier having a series of stock spindles, the carrier being rotatably supported for intermittently swinging the spindles to consecutive circular positions, a driving member carried by each of the stock spindles that is constantly rotated from said shaft in all positions of the stock spindles, and a member on each spindle shiftable to connect and disconnect the spindle with the driving member to rotate the same, of mechanism arranged to engage each of the driving members when its spindle is brought to a certain position of the orbit of the spindles to positively shift the driving member to engage and to release the stock spindle, said mechanism comprising a lever pivoted on the machine, a cam drum, a cam on the drum to engage and swing the lever in one direction, a second cam on the drum to engage the lever and swing it back in the opposite direction, a stub shaft rotatable in the frame, an arm on said shaft arranged to engage said driving member to shift it to engage the spindle, means to disengage the driving member when the said arm is retracted, a second arm carried by said shaft arranged to engage a portion of said lever whereby the arm and shaft are swung in one direction, a third arm secured on said shaft, a lever pivoted to said third arm, connections between said operating lever and the lever on the third arm whereby the said latter lever is swung from the former, and an inclined abutment arranged to engage the free end of the lever on the third arm to cause endwise movement of such lever when it is swung by said operating lever to effect the swing of said third arm and the stub shaft in one direction, the stub shaft being swung in the other direction by the engagement of said second arm by the operating lever, said abutment having a transverse face for locking the said third lever against endwise movement to retain the stub shaft in its shifted position until retracted by the engagement of the operating lever with the second arm.

3. In a multiple spindle screw machine, the combination with a driving shaft, a carrier having a series of stock-holding spindles, the carrier being rotatably supported for intermittently swinging the spindles to consecutive circular positions, a driving member carried by each of the stock spindles, means for constantly rotating the driving member from said shaft in all positions of the stock spindles, and a member on each spindle shiftable to connect and disconnect the spindle with the driving member to rotate the same, mechanism arranged to engage each of the driving members when its spindle is brought to a certain predetermined position of the orbit of the spindles to positively shift the driving member in one direction to engage and to shift the driving member in another direction to release the stock spindle, said mechanism including an operating lever, a cam drum, a cam on the drum arranged to engage and swing the lever in one direction to effect the engagement of said driving member, a second cam on the drum arranged to swing the lever in another direction to effect the disengagement of said driving member, and means to engage the lever and lock it against movement during the shifting of the stock spindle carrier to bring another stock spindle to said certain position.

EDWIN C. HENN.

Witnesses:
J. H. DOHNER,
W. R. MITCHELL.